United States Patent [19]
Yabuya et al.

[11] Patent Number: 5,205,887
[45] Date of Patent: Apr. 27, 1993

[54] MANUFACTURING METHOD FOR ARTICLE HAVING FOAMED LAYER

[75] Inventors: Shigeru Yabuya; Katsuhiro Katagiri; Akiyoshi Nagano; Norio Jogan; Hiroshi Suyama, all of Aichi, Japan

[73] Assignee: Toyoda Gosei Co., Ltd., Nishikasugai, Japan

[21] Appl. No.: 694,235

[22] Filed: May 1, 1991

[30] Foreign Application Priority Data

May 1, 1990 [JP] Japan .................... 2-115415
Oct. 29, 1990 [JP] Japan .................... 2-291282

[51] Int. Cl.$^5$ ............................ B29C 65/06
[52] U.S. Cl. ................... 156/73.5; 156/78; 156/79; 156/242
[58] Field of Search .......... 156/73.5, 78, 79, 242; 150/107; 190/115

[56] References Cited

U.S. PATENT DOCUMENTS

| | | | |
|---|---|---|---|
| 3,468,732 | 9/1969 | Hewitt | 156/73.5 |
| 4,058,421 | 11/1977 | Summo | 156/73.5 |
| 4,608,104 | 8/1986 | Holtrop et al. | 156/78 |
| 4,865,784 | 9/1989 | Hill | 264/45.3 |
| 4,891,081 | 1/1990 | Takahashi et al. | 156/78 |
| 5,057,170 | 10/1991 | Legrand et al. | 156/73.5 |

OTHER PUBLICATIONS

E. I. Kulik, et al., "Friction Welding of Plastics", Welding Production, vol. 29, No. 1, Jan. 1982, Cambridge, Great Britain, pp. 5-6.

J. Mengason, "Vibration Welding—Shaking up the Status Quo in Joining Plastic", Plastic Engineering, vol. 36, No. 8, Aug. 1980, Manchester, New Hampshire, pp. 20-23.

Branson, "Diskret Aber Wirkungsvoll, Lineares Vibrationsschweissen".

*Primary Examiner*—David A. Simmons
*Assistant Examiner*—J. Sells
*Attorney, Agent, or Firm*—Cushman, Darby & Cushman

[57] ABSTRACT

A manufacturing method for an article having a foamed layer, comprising the steps of: retaining and fixing an adherent portion having a resin-made reinforcing layer and a foamed layer, the reinforcing layer having an integrally formed design surface; and vibration welding, with a low-frequency wave, the reinforcing layer and a base portion together so as to be integrally bonded while the base portion, formed of resin which can be welded to the reinforcing layer, is in contact with the reinforcing layer. Thus, it is possible to reduce the processes which require a great deal of man-hours, such as the applying and drying of an adhesive material, sewing and mechanically affixing. Consequently, an attractive article can be produced while reducing manufacturing man-hours and providing for automated manufacture.

10 Claims, 3 Drawing Sheets

MANUFACTURING METHOD FOR ARTICLE HAVING FOAMED LAYER

BACKGROUND OF THE INVENTION

1. Field of Invention

The present invention relates to a manufacturing method for a grip article, such as an automobile assist or seat grip, or for an article which has a foamed layer and has a soft feel, such as the cover of a console box or an arm rest of an automobile.

2. Description of Related Art

Grip articles for supporting passengers have been known to be provided in the interior of automobiles or the like. An assist grip, as shown in FIG. 4, may be secured, for example, above the windows of the rear or the front passenger seats. This assist grip is typically composed of a grip portion 100, which the passenger grasps to support himself, and an attaching portion 101 extending from both ends of the grip portion 100. The assist grip is secured to the automobile by fixing the attaching portion 101 to the body of the automobile by mechanical fixing means such as screws.

Although a resin-made molded product has been used previously to construct such an assist grip, the resin-made product does not have an attractive appearance and feels hard when grasped. Therefore, assist grips having foamed layers have been used in recent years. Such an assist grip is composed of a resin-made base portion, a foamed layer coated on a part of the base portion, and an outer layer coated on a surface of the foamed layer. The foamed layer is generally provided at the center portion of the assist grip. The base portion projects from both ends of the grip portion and constitutes attaching portions. Generally, the surface of the grip portion is continuous with the surfaces of the attaching portions, and, as one views the assist grip, each surface is substantially level with the other.

A manufacturing method for an assist grip having a foamed layer such as is described above is generally as follows: First, the base portion, including a portion having a small diameter, is provided. Next, a flexible material, made of a foamed layer and an outer layer, separately formed by a laminate method or the like, is wound around the small diameter portion. The ends of the flexible material are then sewn to form the grip portion.

As regards the cover of a console box, an outer layer material constructed of laminated vinyl chloride is shaped, by a vacuum forming method or the like, on a surface of a foamed sheet, such as a urethane foam. The shaped outer layer material is then disposed in a mold. An injection molding method or the like is employed to integrally form a reinforcing layer on a reverse surface of the outer layer material. The reinforcing layer thus retains the shape of the outer layer material. Thereafter, an attaching plate (base plate), formed separately, is secured to the reinforcing layer by means of screws or similar means. One end of the attaching plate is then swingably secured to the console box so as to function as the cover.

Moreover, it is undesirable for the grip portion of the grip article discussed above to shift relative to an axial or a circumferential direction of the base portion. For this reason the foamed layer has been secured to the base portion by providing a bonding layer between the foamed layer and the base portion. This manufacturing method of a conventional grip article having a foamed layer thus requires a bonding operation as well as sewing processes and thereby greatly increases the manufacturing man-hours.

Moreover, even if the size of the console box is small, the cover of the console box is typically affixed at a minimum of ten positions. Increasing the number of parts further increases manufacturing costs and decreases productivity. Another shortcoming is that when the cover is opened, the screw heads of the known cover arrangements are visibly, which visibility detracts from the appearance of the cover.

SUMMARY OF THE INVENTION

The present invention solves the above problems by providing a method of easily manufacturing an article having a foamed layer and by reducing the required manufacturing man-hours.

A vibration welding method has been conventionally employed to bond resins together. This vibration welding method is effectively used when bonding resins through which vibrations are easily transmitted. In the case of articles having foamed layers, however, because the foamed layers can absorb vibrations, the efficiency at which vibration energy is converted into heat energy is decreased, thereby making it difficult to apply the vibration welding method to bonding articles having foamed layers. However, as a result of diligent research, the present inventors have found that the vibration welding method can be employed in bonding a resin material to an article having a foamed layer, which finding results in the method of the present invention.

The invention provides a manufacturing method for an article having a foamed layer, comprising the steps of: retaining and fixing, an adherent portion having a resin-made reinforcing layer and a foamed layer, the reinforcing layer including a design surface integrally formed on one surface; and vibration welding the reinforcing layer to a base portion with a low-frequency wave so as to cause the reinforcing layer to be integrally bonded with the base portion, which base portion is formed of a resin which can be readily welded to the reinforcing layer.

The adherent portion is composed of a resin-made reinforcing layer and a foamed layer. For example, the adherent portion of an assist grip is composed of a foamed layer and a resin-made reinforcing core material serving as a reinforcing layer. A cylindrical body is divided in parallel into a plurality units in an axial direction thereof. In other words, a plurality of adherent portion can be bonded together to form the cylindrical body serving as a grip portion.

A well-known foam, such as a urethane foam or a polyvinyl chloride foam, may be used as the foamed layer. The reinforcing and foamed layers maybe separately formed and then integrally connected through bonding, or the foamed layer may be disposed inside a mold and then integrally formed with the reinforcing layer.

It is desirable that a surface of the foamed layer be integrally coated with an outer layer made of leather, woven fabric, polyolefin, or vinyl chloride resin. A well-known coating method, such as a method in which the outer layer is disposed in a mold during foam molding, or a method in which the outer layer is bonded to a foamed sheet by a laminate method, may be used as a coating method for the outer layer.

The base portion serves as the base of an article manufactured according to the invention. For example, the base portion of an assist grip has a small diameter portion at a center part thereof, with the above adherent portion being bonded to this small diameter portion. The resin used to construct the base portion should be of a type that can be welded to the material comprising the reinforcing layer.

In a welding process which constitutes a unique feature of the invention, welding permits the base portion to be integrally secured to the adherent portion. Also, in the welding process, the base portion is caused to vibrate with a low-frequency wave in order to perform vibration welding. It is possible to vibrate the adherent portion to perform vibration welding, however, since the foamed layer absorbs part of the vibration, vibration energy is not transmitted effectively. As a result, bond strength decreases, and it takes a long time to weld these components together. In the present invention, therefore, the base portion is caused to vibrate. Furthermore, the reason for employing a low-frequency wave is that it is difficult to weld, by ultrasonic welding or the like, the base portion to the adherent portion when the foamed layer is involved. A low-frequency wave, preferably having a frequency of a range between 150 Hz and 300 Hz, is utilized to vibrate the base portion. Thus, attenuation is reduced, and a weld having a of high bond strength can be performed in a short period of time.

In the manufacturing method for an article having a foamed layer in accordance with this invention, while the adherent portion is held in place on the side of the foamed layer, the base portion first comes in contact with the reinforcing layer, and is then caused to vibrate with a low-frequency wave. The surface of the reinforcing layer of the adherent portion and that of the base portion are vibrated and welded together by frictional heat.

The adherent portion is held in place on the side of the foamed layer as mentioned above. Therefore, as the base portion vibrates, through the deformation of foamed layer, the adherent portion likewise vibrates. Although this increases the difficulty of welding, the base portion and the adherent portion generally differ in natural frequency, so that the vibration phases of these components differ. Further, a difference in the vibration stroke makes it possible to weld the two components together.

According to the manufacturing method of invention, since the rigid base portion is caused to vibrate, the vibration is transmitted with certainty to an abutting area between the base portion and the reinforcing layer, making it possible to perform welding. Thus, it is possible to reduce the processes which require a great deal of man-hours, such as the applying and drying of an adhesive material, sewing, and mechanically affixing. Consequently, manufacturing man-hours can be reduced and the manufacturing process can be automated.

Moreover, if a plurality of types of adherent portions, with different outer layer materials are used, articles can be readily manufactured according to their grades. Thus, it is possible to manufacture various types of articles by using a few parts.

Because there is substantially no gap between the grip portion and the base portion of a grip article produced by the manufacturing method according to the invention, the present process enhances the appearance of the article produced. Furthermore, because the grip portion, together with the foamed layer, is welded to the base portion with complete reliability, it feels soft while being grasped. It is also possible to prevent the grip portion from shifting relative to the base portion.

In addition, the appearance of the console box is improved, because the heads of screws or the like do not appear on the surface of the base portion when the cover is opened.

BRIEF DESCRIPTION OF THE DRAWINGS

FIGS. 1 through 3 show a grip article produced by a manufacturing method in accordance with a first embodiment of the present invention, in which;

FIG. 1 is a front view showing essentially the grip article;

FIG. 2 is a cross-sectional view taken along line 2—2 of FIG. 1;

FIG. 3 is a cross-sectional view taken along line 3—3 of FIG. 2;

FIGS. 5 through 7 are related to a second embodiment of this invention, in which;

FIG. 5 is a cross-sectional view showing the cover of a console box produced by the manufacturing method according to the present invention;

FIG. 6 is a perspective view illustrating essentially a base portion; and

FIG. 7 is a view used for explaining a vibration welding method.

DETAILED DESCRIPTION OF THE PREFERRED EMBODIMENT

Figure 1:
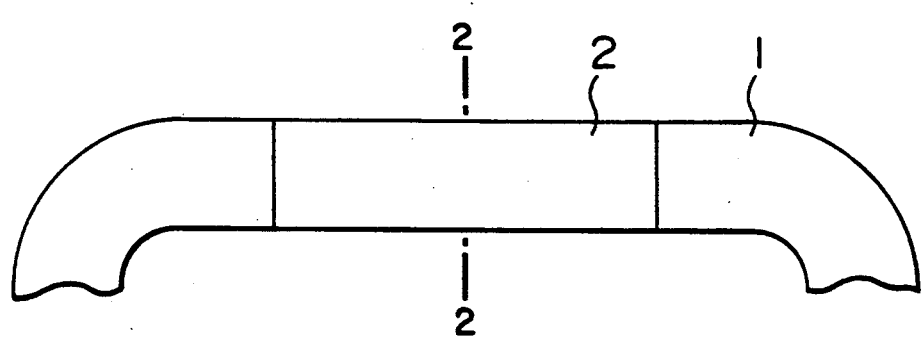
Figure 2:
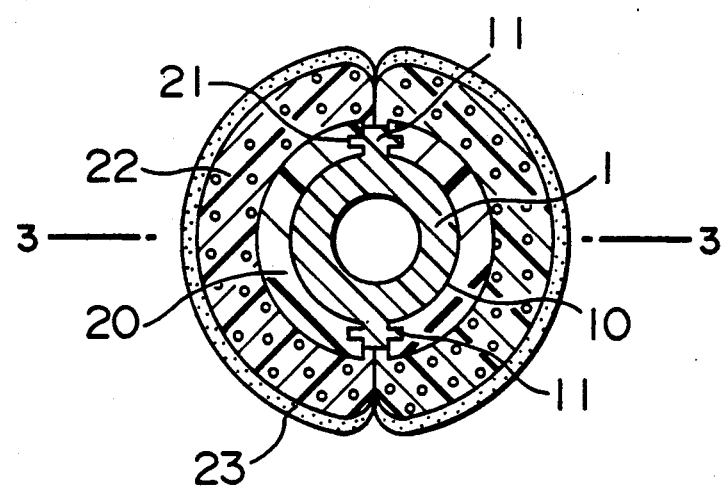

The present invention will be described below in detail based on the embodiments.

First Embodiment

FIGS. 1 through 4 show an assist grip manufactured according to the first embodiment. This assist grip has a grip portion 100 and an attaching portion 101, and is shaped substantially in the form of an inverted "U" with a base portion 1 being disposed at both ends of an adherent portion 2. The adherent portion 2 is divided in parallel into two units 24, 25 in an axial direction thereof. A small diameter portion 10, to which the adherent portion 2 is integrally secured, is formed at the center of the base portion 1.

The adherent portion 2 is composed of core materials 20, foamed layers 22 integrally bonded to the core materials 20, and outer layers 23 bonded to the surfaces of the foamed layers 22. Each half-cylinder shaped core material 20 serves as a reinforcing layer. The core materials 20, the foamed layers 22, and the outer layers 23 are integrally bonded together.

Process for Forming the Base portion

An injection molding method is employed to form the substantially cylindrical base portion 1 of a polypropylene resin mixed with a filler, a pigment, and the like. The small diameter portion 10 is formed at the center of the base portion 1, and serves as a grip portion. Two ribs 11, which in cross section are cross-shaped, are formed on the outer circumference of the small diameter portion 10, and extend along the axis of the base portion 1.

Process for Forming the Adherent Portion

The core materials 20 are injection molded as with the base portion 1. These core materials 20 are made of a polypropylene resin mixed with the same filler, pigment and the like as is the base portion 1. The length of each core material 20 is a little shorter than that of the small diameter portion 10. Grooves 21, with which the ribs 11 are to be engaged, are formed at the end of the core materials 20, and extend in a longitudinal direction along the length of core materials 20. Two core materials 20 are provided for each base portion 1. When these core materials 20 are affixed to the base portion 1 so as to form a cylinder, the inside diameter of the cylinder thus formed is substantially equal to the outside diameter of the small diameter portion 10.

Figure 3:
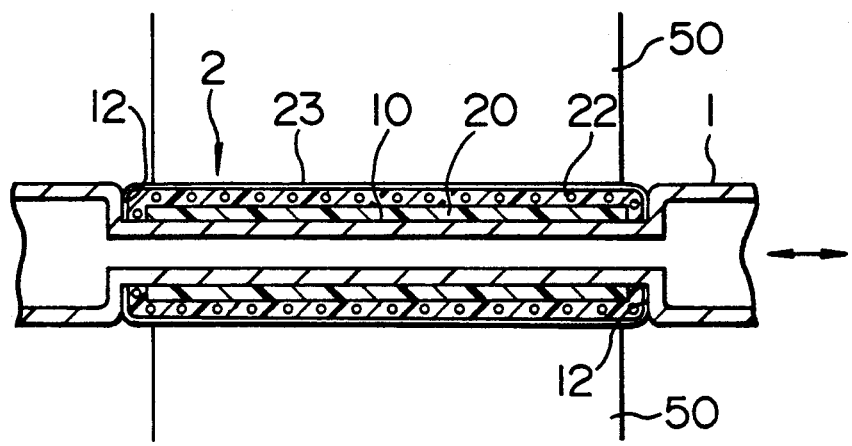

Next, each of the two core materials 20 are placed in a mold in which a leather-made outer layer material has been previously disposed. A foam molding method is employed to integrally form, by using urethane foam, the foamed layer 22 and the outer layer 23 on the surfaces and both ends of the core materials 20. As shown in FIG. 3, the foamed layer 22 covers the surface as well as both the ends of the core materials 20. It is thus bonded to the core materials 20 so as to form the adherent portion 2 as an integral structure.

Process for Welding

Figure 4:
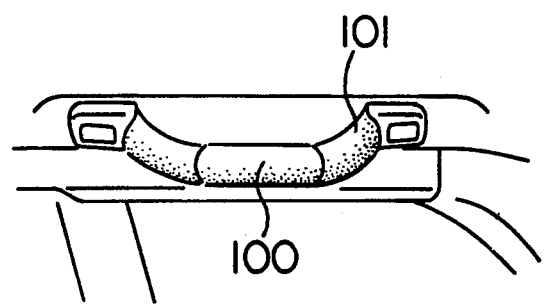
FIG. 4 is a perspective view showing an assist grip.

Two adherent portions 2 are affixed to the small diameter portion 10. The ribs 11 engage with the respective grooves 21 to form a cylinder. While the adherent portions 2 are held in place by a fixture 50, the base portion 1 is caused to vibrate with a low-frequency wave having an amplitude of 800 μm, and a frequency of 200 Hz in the direction indicated by an arrow in FIG. 3. At this stage, the foamed layers 22, which coat both of the core materials 20, are compressed by the base portion walls 12 located at the ends of the small diameter portion 10. This compression provides vibrations during vibration welding, whereby the base portion 1 and the core materials 20 are integrally welded. The engagement of the ribs 11 with the grooves 21 makes it possible to obtain a wide bonding surface as well as high bond strength. As shown in FIG. 4, it is thus possible to manufacture the assist grip composed of the flexible grip portion 100 and the rigid attaching portion 101.

In other words, according to the manufacturing method disclosed in this embodiment, the rigid base portion 1 is caused to vibrate, and this vibration is transmitted with complete reliability to the interface between the base portion 1 and the core materials 20. Therefore, the base portion 1 can be welded to the core materials 20 so as to yield a high bond strength in a short period of time. Also, because there is no gap in the abutting area that extends in the circumferential direction between the base portion 1 and the adherent portions 2, an attractive appearance is provided. Although a boundary line is formed in the abutting area between the two adjacent portions 2 and extends along the axial direction of the base portion 1, it offers a unique appearance and an improved design. Furthermore, because the process requiring a great deal of manufacturing man-hours, such as sewing and bonding, are rendered unnecessary, manufacturing costs are reduced.

Second Embodiment

Figure 5:
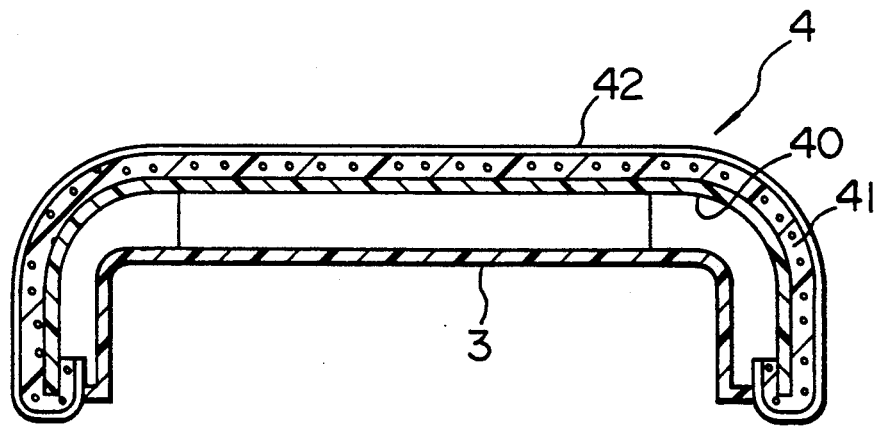

FIG. 5 shows a cross-sectional view of the cover of a console box produced by the manufacturing method according to the second embodiment. The cover is composed of an adherent portion 4 and a base portion 3 made of polypropylene (PP).

Figure 6:
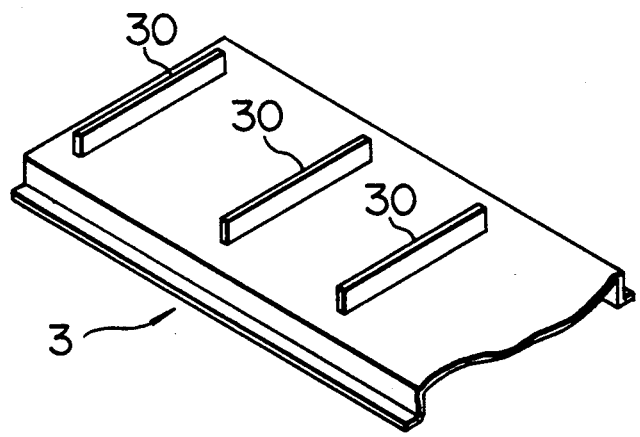

As illustrated in FIG. 6, a perspective view, a plurality of ribs 30 are arranged on one surface of the base portion 3. The edges of these ribs 30 are to be welded to reinforcing plate 40, which welding will be described in detail below, so as to be integrally secured to the adherent portion 4.

The adherent portion 4 is made up of the PP-mode reinforcing plate 40, a PP foam 41 having an expansion ratio of 15-20 is bonded integrally to the reinforcing plate 40, and a polyvinyl chloride (PVC)-made outer layer 42 is coated on the surface of the PP foam 41. The adherent portion 4 is constructed in the following way. A vacuum forming method is used to provide a predetermined shape to a laminated sheet of the PP foam 41 and the PVC outer layer 42. The preformed sheet is thereafter disposed in a mold, and PP introduced into the open mold. The reinforcing plate 40 is formed by closing the mold with the plate 40 becoming bonded to the PP foam 41.

Figure 7:
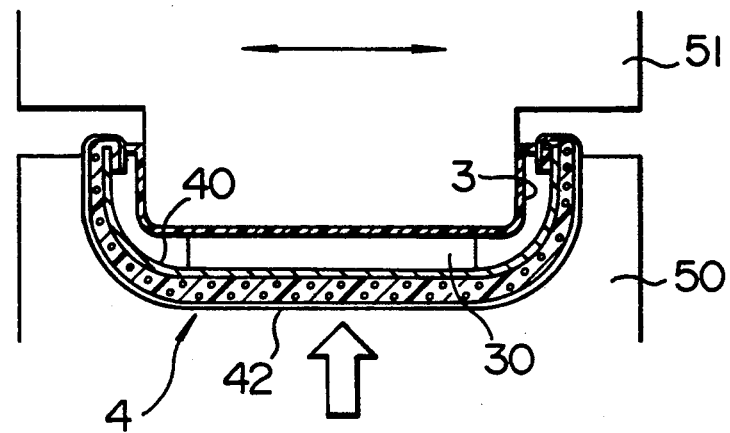

The base portion 3 is welded to the adherent portion 4 as follows: As shown in FIG. 7, first, the adherent portion 4 is held in place by a first fixture 50. At this stage, it should be disposed so that the outer layer 42 comes in contact with the first fixture 50, and the reinforcing plate 40 is exposed so as to face upward.

Next, the base portion 3 is disposed over the outer layer 42 so that the ribs 30 come in contact with the reinforcing plate 40. The base portion 3 is then retained by a second fixture 51. Thereafter, the first and second fixtures 50 and 51 are driven so as to approach each other, whereby the reinforcing plate 40 is pressure-welded to the ribs 30 with a load of 500 kgf. Under these conditions, the second fixture 51 is made to vibrate in the direction in which the ribs 30 extend (in the direction indicated by an arrow in FIG. 7). Vibration is performed under the following conditions: an amplitude of 1.5 mm on one side, and a frequency of 240 Hz.

This allows the surface of the reinforcing plate 40 to be welded to the edges of the ribs 30. The base portion 3 is thus integrally bonded to the adherent portion 4. During vibration, the edges of the base portion 3 are in contact with the edges of the outer layer 42 of the adherent portion 4. No load, however, is applied to the contact portions. As a result, these contact portions are not welded together, and the appearance is not spoiled.

Thus, in accordance with the manufacturing method of this embodiment, productivity is improved in that it is not necessary to affix the base portion and the reinforcing plate utilizing screws or similar means as in the conventional art. Moreover, the appearance of the console box is improved in that the heads of screws or other mechanical fixing means do not appear on the surface of the base portion 3 when the cover is opened.

What is claimed is:

1. A manufacturing method for an article having a formed layer, comprising the steps of:
   providing a thermoplastic base portion and an adherent portion, said adherent portion including a thermoplastic reinforcing layer and a foamed layer formed on a surface of said reinforcing layer;
   holding said foamed layer;
   contacting said base portion with said reinforcing layer and holding an end portion of said foamed layer between an end portion of said reinforcing layer and said base portion; and
   vibrating said base portion and compressing said end portion of said foamed layer by vibrations so as to weld said reinforcing layer and said base portion.

2. A manufacturing method for an article having a foamed layer according to claim 1, wherein the compressing direction of said foamed layer is parallel to the direction of vibration.

3. A manufacturing method for an article having a foamed layer according to claim 1, wherein said adherent portion has a skin layer on said foamed layer.

4. A manufacturing method for an article having a foamed layer according to claim 3, wherein said skin layer is made of the material selected from the group consisting of leather, fabric, vinyl chloride resin and polyolefin resin.

5. A manufacturing method an article having a foamed layer according to claim 1, wherein said reinforcing layer, said base portion and said foamed layer are made of polypropylene.

6. A manufacturing method for an article having a foamed layer according to claim 5, wherein said reinforcing layer is formed in a mold in which said foamed layer is located, so as to bond said reinforcing layer and said foamed layer.

7. A manufacturing method for an article having a foamed layer according to claim 1, wherein said foamed layer is made of the material selected from the group consisting of polyurethane, polyvinyl chloride and polypropylene.

8. A manufacturing method for an article having a foamed layer according to claim 1, wherein said foamed layer is formed in a mold in which said reinforcing layer is located, so as to bond said reinforcing layer and said foamed layer.

9. A manufacturing method for an article having a foamed layer according to claim 1, wherein said base portion has a rib on a surface facing said reinforcing layer, and said reinforcing layer has a groove, said method including bonding said rib and groove by said vibrating step.

10. A manufacturing method for an article having a foamed layer according to claim 1, wherein said adherent portion is divided into a plurality of units, and said plurality of said units is bonded together at the step of vibration welding.

* * * * *